United States Patent [19]

Payne

[11] Patent Number: 4,572,096
[45] Date of Patent: Feb. 25, 1986

[54] BOAT CONSTRUCTION

[76] Inventor: David E. Payne, Villa 133, Captain John Fripp's Villas, Fripp Island (Beaufurt), S.C. 29901

[21] Appl. No.: 578,565

[22] Filed: Feb. 9, 1984

Related U.S. Application Data

[63] Continuation-in-part of Ser. No. 356,371, Mar. 9, 1982, abandoned.

[30] Foreign Application Priority Data

Mar. 10, 1981 [AU] Australia .............................. PE7933

[51] Int. Cl.4 ............................................. B63B 3/00
[52] U.S. Cl. ....................................... 114/88; 114/356
[58] Field of Search .................... 114/79 R, 88, 356; 403/217, 218, 205, 403; 24/129 R, 115 K

[56] References Cited

U.S. PATENT DOCUMENTS

| 3,190,408 | 6/1965 | Petterson | 114/88 |
|---|---|---|---|
| 3,190,409 | 6/1965 | Petterson | 114/88 |
| 3,429,088 | 2/1969 | Katzman | 114/356 X |
| 3,925,956 | 12/1975 | Atbinson et al. | 403/217 |

FOREIGN PATENT DOCUMENTS

| 77465 | 10/1950 | Norway | 114/88 |
|---|---|---|---|
| 2073308 | 10/1981 | United Kingdom | 403/217 |

Primary Examiner—Sherman D. Basinger
Attorney, Agent, or Firm—Jay L. Chaskin

[57] ABSTRACT

Sheets of a vessel or other construction are joined edge to edge by deforming an edge of each sheet to have a projection outstanding from one face of the sheet, the deformed edge is entered into a slot of a joining strip and the outstanding projections are moved across in the slot so that they engage behind an abutment existing in a wall of the slot, and a key is also inserted in the slot to bear against the other face of the sheet and thereby maintain the engagement of the projections with the abutment. The ends of joining strip are then clamped between clamping blocks with such pressure that sliding movement of the sheet edge within its slot is inhibited and the slot is prevented from opening, e.g. upon impact forces.

39 Claims, 8 Drawing Figures

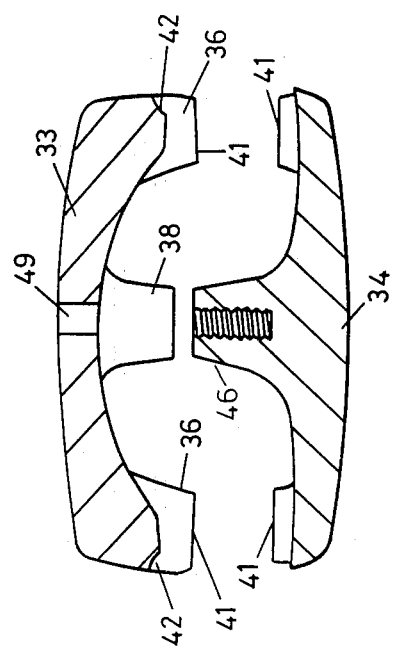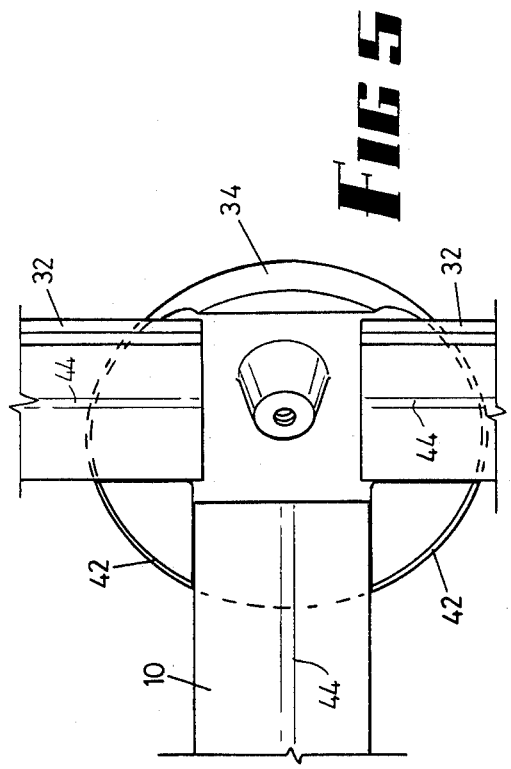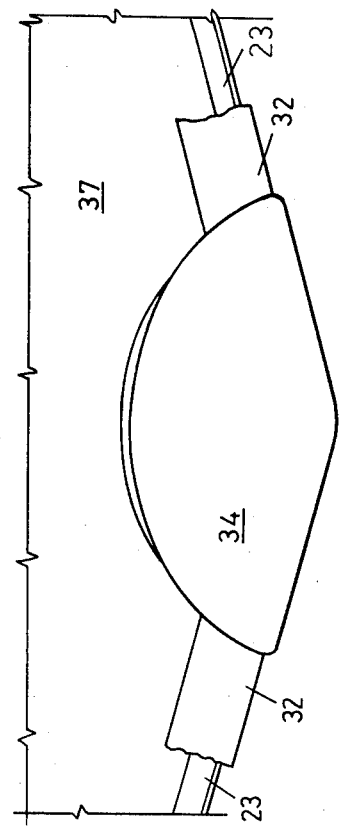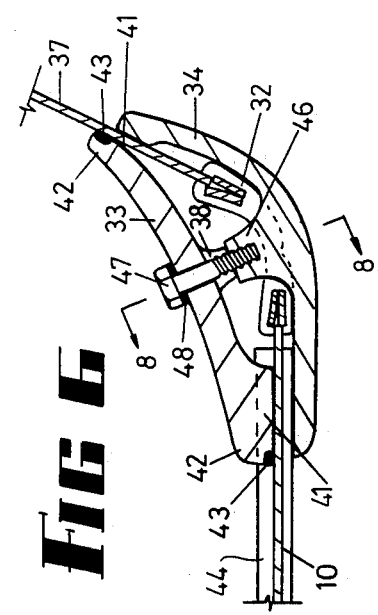

BOAT CONSTRUCTION

This application is a continuation-in-part application of application Ser. No. 356,371, filed Mar. 9, 1982 and now abandoned.

This invention relates to improvements in the construction of a vessel (for example, a small boat) wherein use is made of metal sheets.

BACKGROUND OF THE INVENTION

Metal boats are usually constructed by a process of forming metal sheets, for example two sheets side by side for the underwater panels, two side panel sheets joined at their front ends to a stem and along their lower edges to the underwater panels, and a sheet for the transom. The sheets are welded, where they join one another, frequently to extrusions of metal, and this welding operation is one of the most expensive operations in the construction of a boat hull. The most commonly used metal in such construction is marine grade aluminium, and this suffers with the phenomenon of a heat affected zone near the weld zone which is subject to cracking under fatigue loading. The invention herein is directed to improvements whereby the welding can be reduced or eliminated, and although the invention can, with the necessary changes, be applied to a boat having sheets of steel, it is described hereunder with reference to a boat having aluminium sheets.

In the U.S. Pat. No. 3,190,409 (Petterson) there was described a construction using a wedge shaped band forced between a plate and a leg of a slot, but this arrangement did not provide a positive interlock between the plate and joining strip, and experimental work by the inventor herein has established that an interlock is very desirable.

In the U.S. Pat. No. 3,190,408 of Petterson, there were further structures described and these included structures wherein sheets were joined by deforming an edge of each sheet to have an outstanding projection which entered into a slot of a joining strip and moved across in that slot to engage behind an abutment existing in the wall of the slot, and a key inserted to maintain engagement.

Experimental work conducted by the applicant herein has indicated that excellent results can be achieved with such construction. However the safety requirements for boats is such that a higher degree of integrity must be achieved and it is a main object of this invention to provide still further improvements.

It will be appreciated that with any vessel, particularly with a boat, the most vulnerable point of a hull is the corner between adjacent panels inclined at an angle to one another since such a point is the most likely point to encounter impact, and furthermore impact imparted to one panel can be transmitted to other panels through that point.

There are several situations which are frequently encountered in practice.

Firstly, if a sheet of metal forming a panel of a boat is subjected to impact between its ends, there will be a sliding of the sheet edge within its joining strip which will cause shearing of sealant between the surfaces and allow the boat to leak. The large mechanical advantage which exists to cause such sliding can cause movement of the end of the sheet away from the end of its joining strip, and it has been found desirable to provide means which will inhibit such sliding motion as much as possible.

If the corner between joining strips is subjected to impact, the resulting deformation of the channel walls is usually a spreading apart of those walls at that locality, and this also has the effect of separating the contiguous surfaces with the failure of the sealant therebetween. Once the joint fails at its end, progressive failure along the length of the joint could occur quite easily and this of course constitutes a serious hazard for leaking of water into the boat.

BRIEF SUMMARY OF THE INVENTION

This invention relates to a method of construction of a vessel, using sheets and joining strips, each joining strip being of constant cross-sectional shape and having a slot containing abutments, and each sheet being deformed near one edge to have a retaining surface projecting from one face, the retaining edge being retained in engagement with the abutment by inserting a key to bear against the other face of the sheet, the retaining key also being retained by engaging an abutment. The invention is particularly characterised by clamping blocks which clamp the ends of the joining strip over the sheet.

More specifically, the invention consists of a method of constructing a vessel, comprising (a) producing a constant cross-sectional shaped joining strip having facing surfaces defining a slot and a pair of facing ribs within the slot forming respective abutments, (b) deforming a sheet of material near one edge thereof to provide a retaining surface projecting from one face of the sheet, (c) inserting the deformed edge of the sheet into the slot and locating the retaining surface adjacent a first one of said abutments, (d) inserting a key into the slot to locate against the other said abutment and also to bear against the other face of the sheet thereby maintaining engagement of said retaining surface with said first abutment, and (e) clamping the ends of said strip and portions of said sheet adjacent those ends with respective pairs of clamps by urging one of each pair into surface-to-surface engagement with inner surfaces of said strip and sheet and the other of each pair into surface-to-surface engagement with outer surfaces of said strip and sheet so as to thereby firmly close and clamp the strip ends against the sheet and key.

In an embodiment of the invention a vessel comprises a plurality of sheets and interconnecting means comprising at least one joining trip having walls defining slots therein, each slot having abutments projecting into said slot from respective said walls, each said sheet having a retaining surface projecting from one face of the sheet, a key in that said slot located against a first said abutment and bearing against the other face of the sheet and thereby maintaining engagement of the retaining surface with the other said abutment, and respective pairs of clamps, each pair of clamps having a clamping bolt which urges inner and outer clamps thereof into surface-to-surface engagement with respective inner and outer surfaces of the joining strip so as to firmly close and clamp the strip ends against the sheet and key.

In some embodiments of the invention, sealing is achieved by the introduction of a sealant into the slot or slots of the vessel.

With this invention it is possible in some instances to construct a vessel while completely avoiding welding, and in other instances reducing welding to a minimum, thereby reducing costs and at the same time reducing danger of damage to the aluminium temper which can otherwise be imparted by the welding portion. The sealing can be mechanical, for example by distortion of portion of the strip at the locality of the seal, it can be with a mastic material, with a flexible resin based glue or with a rigid resin based glue or with a selected combination of the above. Clearly a vessel constructed by the method of this invention will have a strong interlock between the sheets, supplemented by a very firm clamping of the joining strip which greatly increases the integrity of the joint at the most vulnerable locality. In this respect the invention is distinguished over prior art proposals wherein sheet metal has merely been clamped against a wall defining a slot in the strip.

Applicant herein has established by distortion tests that properly constructed vessels utilising the positive interlock construction of this invention have a very high factor of safety, and that embrittlement zones can be almost or entirely eliminated.

If the clamping blocks are so arranged that the inner block of any pair of blocks is very rigid, the outer block less rigid than the inner block, but still more rigid than the joining strip, clamping of the blocks together will cause firm clamping of the sheet edge within the slot of the joining strip and subsequent deformation of the outer block with only a small degree of deformation of the inner block. The blocks can be arranged that when so clamped, the facing surfaces of the inner and outer blocks are complementary to the contiguous surfaces of the sheet and joining strip, so that the blocks clamp the joining strips to their sheet edges as well as clamping the sheets themselves and this arrangement has been found to have a marked effect on the improvement in the strength of a joint.

BRIEF DESCRIPTION OF THE DRAWINGS

An embodiment of the invention is described hereunder in some detail with reference to and are illustrated in the accompanying drawings, in which FIG. 5 is a plan view showing an outer clamp of a pair of clamps which are used to clamp the rear end of the keel to the underwater and transom panels of a vessel, FIG. 5 not showing these panels but showing the joining strips which join them, FIG. 6 is a fragmentary longitudinal section showing the inner and outer clamps of that pair of clamps interconnecting the joining strips and panels, FIG. 7 is a rear end elevation of the assembly, and FIG. 8 is an "exploded" section taken on line 8—8 of FIG. 6 and illustrating the configuration of the clamps.

DETAILED DESCRIPTION OF THE PREFERRED EMBODIMENTS

Figure 1:
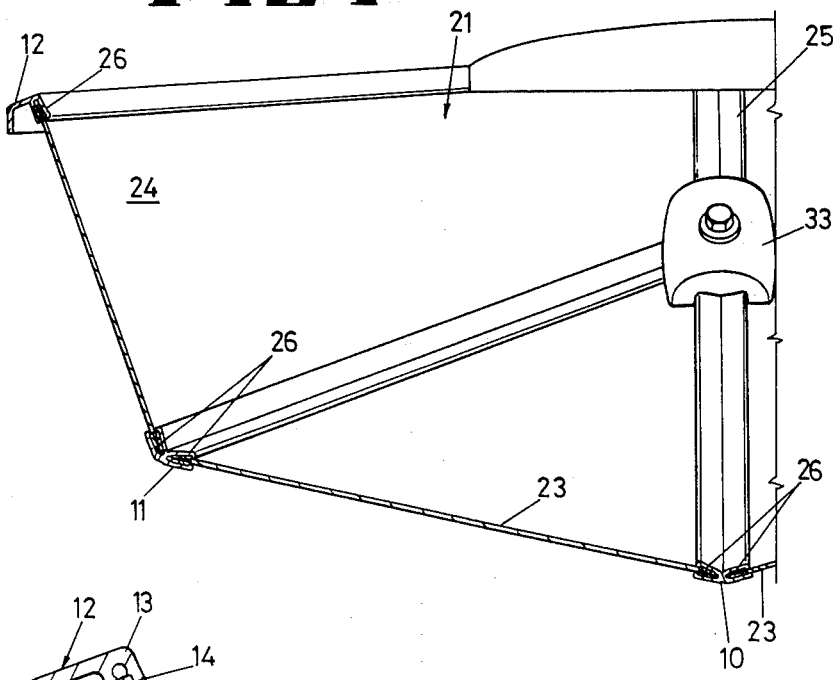
FIG. 1 is a fragmentary diagrammatic cross-section (looking forwardly) of a boat.
Figure 2:
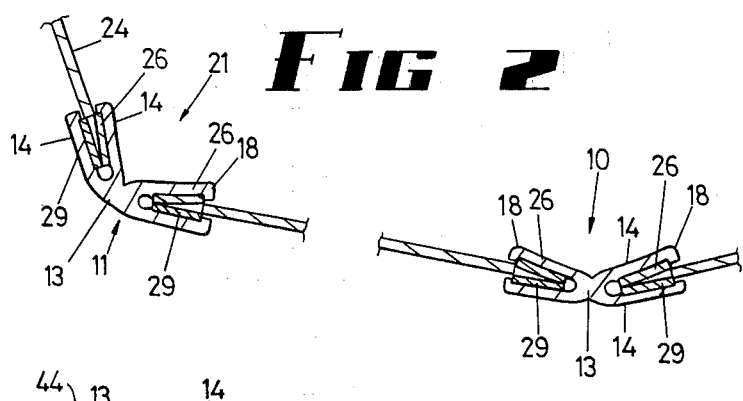
FIG. 2 is an enlarged fragmentary view showing application of the invention at three localities.
Figure 3:
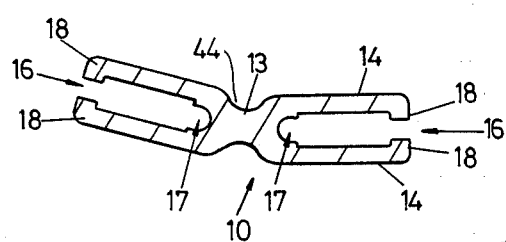
FIG. 3 is an enlarged cross-section of the keel extrusion illustrated in FIGS. 1 and 2.

In the first embodiment of FIGS. 1, 2 and 3, each of a keel extrusion joining strip 10, chine extrusion joining strip 11 and gunwhale extrusion joining strip 12 is formed to have a base web 13 and at least one pair of flanges 14 substantially parallel to one another, and where there are two pairs of flanges 14 (in the case of the keel extrusion 10 and the chine extrusion 11), the base web 13 is a waisted portion which can be readily deformed. The inner surfaces of each pair of flanges 14 define respective slots 16, and each of the slot forming walls has a respective rib 18 which constitutes an abutment. FIG. 3 illustrates an example wherein there are two such ribs 18 in each slot 16, and each slot 16 has a part-circular base recess 17 which provides a conduit for subsequent sealant injection.

FIGS. 1 and 2 illustrate a boat 21 constructed according to the invention, having two sheets joined side-by-side to form underwater panel sheets 23 and two side panel sheets 24 joined at their front ends to a stem 25 and along the chines to the underwater sheets 23.

Figure 4:
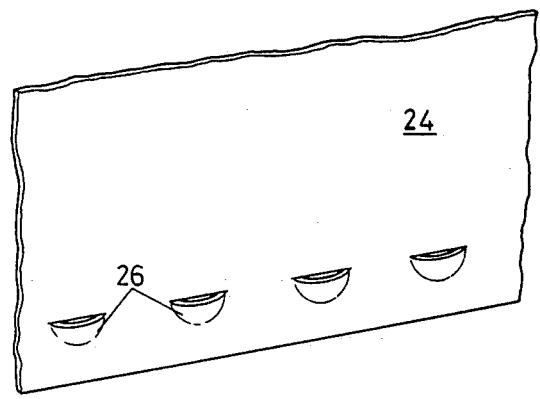
FIG. 4 is a fragmentary perspective view of a sheet illustrating the configuration of "thumb nail" projections.

Each sheet of metal where it is to be joined to the extrusion is of identical alloy composition (to avoid electrolytic action when immersed), and is provided with a plurality of lanced "thumb nail" projections 26 (FIG. 4), the shear edges of which are displaced from one face of the relevant sheet so as to form outstanding retaining surfaces which abut the abutment ribs 18 within the respective slots 16.

To effect assembly of the panels to the extrusion, the extrusions are first formed to the required shape and it should be noted that the flanges 14 on each side of the waisted portions of the base web 13 subtend different angles along their length. The panels are curved to fit into the slots 16, with the projecting retaining surfaces of the "thumb nail" projections 26 inserted on the same side as the rib 18 of each respective extrusion. The retaining surfaces are then urged transversely within each of the slots by insertion of retaining keys 29. They are retained in these positions by the retaining keys 29 being wedged tightly into the slots, and since the flanges 14 are both provided with ribs 18 (as in FIG. 3) both the panels and the keys then engage with a mechanical interlock.

In some instances a sufficiently water-tight joint is effected without the addition of further sealing, but in the case of a boat it is desirable to use one of the many readily available sealants which will flow into interstices caused by irregularities and at the same time cement the elements together. One sealant which is found to be effective is sold under the trade mark VULKEN as a "composite water proofing walking deck", the manufacturer being Mameco International of 4475 East 175th Street, Cleveland, Ohio, U.S.A. This material is applied to that portion of the sheet or panel which will be inserted into a slot and also to both sides of the key.

In this embodiment all panels are interconnected by joining strips 10, 11 and 12 for the underwater panels, side panels and gunwhales, and by the two transom joining strips 32 (FIGS. 5, 6 and 7), and all corners between adjacent joining strips are interconnected by a respective pair of clamps, each comprising an inner clamp 33 and an outer clamp 34. Since the facing surfaces of the clamps 33 and 34 need to become complementary to the shapes of the joining strip ends and the panels of those localities, each pair of clamping strips will be of slightly different configuration but the configuration illustrated in FIGS. 5, 6, 7 and 8 is illustrative of the requirements for the other localities.

The inner clamp 33 is provided with a pair of downwardly facing flanges 36 which bear against a groove 44 in the base web 13 of the joining strips 32 which join the underwater panel sheets 23 to the transom panel sheet 37. At the same time a central flange 38 bears downwardly in the groove 44 in the base web 13 of the keel joining strip 10. The surfaces designated 41 are panel engaging surfaces, and these terminate in recesses 42 which contain sealant 43.

The outer clamp 34 is much more rigid than the joining strips 10 or 23 but less rigid than the inner clamp 33. The outer clamp 34 has a centrally located inwardly directed boss 46 which is threadably engaged by a clamp bolt 47 which extends through an aperture 49 in the inner clamp 33 and is sealed with respect thereto by a nylon washer 48. The outer clamp 34 is initially made with more curvature than the required final shape so that when the bolt 47 is tightened, it spreads to bear against the outer surfaces of the joining strips 10 and 32 to initially force the joining strip 32 into a clamping condition with the panel edges, and subsequently bears against the outer surfaces of panels 23 and 37 so that these are also clamped. Thus at the locality of each corner there exists a double clamping effect which has been found to be effective in inhibiting failure of the joint between panel and joining strip.

Various modifications in structure and/or function or steps may be made to the disclosed embodiments by one skilled in the art without departing from the scope of the invention as defined by the claims.

I claim:
1. A method of contructing a vessel, comprising:
    (a) producing a constant cross-sectional shaped joining strip having facing surfaces defining a slot and a rib within the slot forming an abutment,
    (b) deforming a sheet of material near one edge thereof to provide a retaining surface projecting from one face of the sheet,
    (c) inserting the deformed edge of the sheet into the slot and locating the retaining surface adjacent the abutment,
    (d) inserting a key into the slot to bear against the other face of the sheet thereby maintaining engagement of said retaining surface with said abutment, and
    (e) clamping the end of said strip and portions of said sheet adjacent the end with a pair of clamping means by urging one of each pair into surface-to-surface engagement with inner surfaces of said strip and sheet and the other of each pair into surface-to-surface engagement with outer surfaces of said strip and sheet so as to thereby firmly close and clamp the strip end against the sheet and the key.

2. A method according to claim 1 further comprising producing said joining strip by an extrusion process to have a pair of spaced flanges and ribs extending into said slot from respective said flanges near the outer edges thereof, said ribs defining the mouth of said slot.

3. A method according to claim 1 further comprising applying a sealant to said sheet and to said key before insertion of said key into said slot, and further applying sealant to the pair of clamping means before effecting said surface-to-surface engagement thereof.

4. A method according to claim 1 further comprising applying sealant to the pair of clamping means before effecting said surface-to-surface engagement thereof, and injecting a sealant into said slot after insertion of said key and said sheet.

5. A vessel comprising a plurality of sheets and interconnecting means comprising at least one joining strip having walls defining slots therein, each slot having an abutment projecting into said slot from respective said walls, each sheet having a retaining surface projecting from one face of the sheet, a key in said slot located against the other face of the sheet and thereby maintaining engagement of the retaining surface with the abutment, and a pair of clamp means having a clamping means which urges inner and outer clamps thereof into surface-to-surface engagement with respective inner and outer surfaces of the joining strip and sheet so as to firmly close and clamp the strip end against the sheet and key.

6. A vessel according to claim 5 wherein the outer clamp of said pair of clamping means comprises an inwardly directed boss containing a clamp receiving means, and the inner clamp has a wall defining an aperture through which said clamping means passes for the clamping of the inner and outer clamps of said pair of clamp means.

7. A vessel according to claim 5 wherein the inner surface of the outer clamp of said pair of clamping means and the outer surface of the inner clamp thereof, are both complementary in shape to the shapes of the joining strip and sheet at an end of the joining strip which is clamped by said clamp means afer resilient deformation of the outer clamp is effected by tightening of said clamping means.

8. A vessel according to claim 5 wherein the inner clamp of said pair of clamping means is relatively rigid and has its outer surface complementary in shape to the shape of the joining strip and sheet at an end of the joining strip which is clamped by said clamp means and the outer clamp of that pair of clamping means is relatively deformable and its inner surface becomes complementary in shape to the shape of the joining strip only after sufficient tightening of said clamping means to effect closing and clamping of said strip end against the sheet and key.

9. A method according to claim 1 wherein said strip is formed to have a pair of facing ribs with the slot forming respective abutments.

10. A method according to claim 9 wherein the retaining surface is adjacent a first one of said pair of abutments.

11. A method according to claim 10 wherein the key is inserted into the slot to locate against the other of said pair of abutments thereby maintaining engagement of said retaining surface with said first abutment.

12. A vessel according to claim 5 wherein the key is located against a first abutment and bearing against the other face of the sheet and thereby maintaining engagement of the retaining surface with the other abutment.

13. A vessel according to claim 5 wherein the clamp means comprises first and second clamp means, the first and second clamp means each having an inner surface and an outer surface, the first clamp means inner surface having an inwardly directed boss extending toward the second clamp inner surface, the boss containing a clamp receiving means, the second clamp means having an aperture through which clamp joining means passes into the clamp receiving means for joining of the first and second clamp means, and the second clamp means having a plurality of downwardly directed flanges facing the first clamp means inner surface and a central flange extending downwardly toward the first clamp means inner surface.

14. A vessel according to claim 13 wherein the inner surface of the first clamp means and the outer surface of the second clamp means are each complementary in shape to the shape of a strip means disposed between the first clamp means inner and second clamp means outer surfaces after resilient deformation of the first clamp means is effected by tightening of the clamping means, the flanges bearing against the strip means.

15. A vessel according to claim 13 wherein the second clamp means is relatively rigid and the outer surface thereof is complementary in shape to the shape of a strip means disposed adjacent thereto, the front clamp means is relatively deformable and the inner surface thereof is complementary in shape to the strip means only after sufficient tightening of the clamping means, the flanges bearing against the strip means.

16. A method of constructing a vessel comprising:
   (a) producing a joining strip having facing surfaces defining a slot;
   (b) inserting an edge of a sheet of material into the slot;
   (c) inserting a key into the slot to bear against a first surface of the sheet to thereby maintain the sheet in the slot, and
   (d) clamping an end of the strip and portions of the sheet adjacent the end so as to firmly close and clamp the strip end against the sheet and the key, wherein the clamping is provided by urging one of a pair of clamps into surface-to surface engagement with an inner surface of the strip and sheet and the other of the pair of clamps into surface-to-surface engagement with an outer surface of the strip and sheet.

17. A method according to claim 16 comprising producing the joining strip with a rib within the slot forming an abutment, the sheet being located adjacent the abutment.

18. A method according to claim 16 comprising deforming the sheet near one edge thereof to provide a retaining surface projecting from a second face of the sheet and locating the retaining surface within the slot.

19. A method according to claim 18 wherein said strip is formed to have a pair of facing ribs with the slot forming respective abutments.

20. A method according to claim 18 wherein the retaining surface is adjacent a first one of a pair of abutments.

21. A method according to claim 20 wherein the key is inserted into the slot to locate against the other of said pair of abutments thereby maintaining engagement of said retaining surface with said first abutment.

22. A method according to claim 16 wherein said strip is formed to have a pair of facing ribs with the slot forming respective abutments.

23. A method according to claims 1 or 16 comprising clamping together an end of the joining strip with a substantially instersecting joining strip.

24. A method according to any one of claims 17 or 18 or 22 or 19 or 20 or 21 or 2 or 3 or 4 comprising clamping together an end of the joining strip with a substantially intersecting joining strip.

25. A vessel comprising a plurality of sheets and interconnecting means comprising at least one joining strip having a slot therein, an edge of each sheet being inserted into the slot, key means in the slot located against a first surface of the sheet and a clamp means for clamping the strip end against the sheet and the key, wherein the clamp means comprises inner and outer clamps, said clamping means urging the inner and outer clamps into surface-to-surface engagement with respective inner and outer surfaces of the joining strip and the sheet.

26. A vessel according to claim 25 wherein each slot has an abutment projecting into the slot, the sheet being located adjacent the abutment.

27. A vessel according to claims 25 or 26 wherein each sheet has a retaining surface projecting from a second face of the sheet, the key means maintaining the retaining surface within the slot.

28. A vessel according to claim 27 wherein said strip has a pair of facing ribs within the slot.

29. A vessel according to claim 28 wherein the clamp means clamps together an end of the joining strip with a substantially intersecting joining strip.

30. A vessel according to claim 27 wherein the retaining surface is adjacent a first one of a pair of abutments.

31. A vessel according to claim 30 wherein the key is inserted into the slot to locate against the other of said pair of abutments thereby maintaining engagement of said retaining surface with said first abutment.

32. A vessel according to claim 31 wherein the clamp means clamps together an end of the joining strip with a substantially intersecting joining strip.

33. A vessel according to claim 30 wherein the clamp means clamps together an end of the joining strip with a substantially intersecting joining strip.

34. A vessel according to claim 27 wherein the clamp means clamps together an end of the joining strip with a substantially intersecting joining strip.

35. A vessel according to claim 25 or 26 wherein said strip has a pair of facing ribs within the slot forming respective abutments.

36. A vessel according to claim 35 wherein the clamp means clamps together an end of the joining strip with a substantially intersecting joining strip.

37. A vessel according to claims 25 or 26 wherein the clamp means clamps together an end of the joining strip with a substantially intersecting joining strip.

38. A vessel according to claims 5 or 25 wherein the clamp means includes a flange which bears against a groove in the joining strip.

39. A method according to claims 1 or 16 wherein the clamping includes inserting a flange into a groove in the joining strip.

* * * * *